(12) United States Patent
Fukuta et al.

(10) Patent No.: US 8,680,896 B2
(45) Date of Patent: Mar. 25, 2014

(54) APPARATUS FOR DRIVING VOLTAGE CONTROLLED SWITCHING ELEMENTS

(75) Inventors: Junichi Fukuta, Anjo (JP); Tsuneo Maebara, Nagoya (JP); Ryotaro Miura, Aichi-ken (JP)

(73) Assignee: DENSO Corporation, Kariya (JP)

( * ) Notice: Subject to any disclaimer, the term of this patent is extended or adjusted under 35 U.S.C. 154(b) by 92 days.

(21) Appl. No.: 13/192,799

(22) Filed: Jul. 28, 2011

(65) Prior Publication Data

US 2012/0025875 A1    Feb. 2, 2012

(30) Foreign Application Priority Data

Jul. 29, 2010    (JP) ................................. 2010-169944

(51) Int. Cl.
*H03K 3/00*    (2006.01)

(52) U.S. Cl.
USPC .......................................... 327/109; 327/108

(58) Field of Classification Search
USPC ................................. 327/109, 108
See application file for complete search history.

(56) References Cited

U.S. PATENT DOCUMENTS

| 2011/0133790 A1* | 6/2011 | Nagata et al. ................. 327/109 |
| 2012/0025875 A1* | 2/2012 | Fukuta et al. ................. 327/109 |
| 2012/0249020 A1* | 10/2012 | Komatsu et al. ............... 318/139 |

FOREIGN PATENT DOCUMENTS

| JP | 2001109525 A | * | 4/2001 |
| JP | P2001-109525 A | | 4/2001 |
| JP | P3430878 | | 5/2003 |
| JP | 2009-060358 | | 3/2009 |
| JP | P2010-154595 A | | 7/2010 |
| JP | 2012217321 A | * | 11/2012 |

OTHER PUBLICATIONS

Japanese Office Action dated Feb. 28, 2012, issued in corresponding Japanese Application No. 2010-169944, with English translation.

* cited by examiner

*Primary Examiner* — Ryan Jager
(74) *Attorney, Agent, or Firm* — Nixon & Vanderhye P.C.

(57) ABSTRACT

An apparatus is provided to drive a voltage controlled switching element having a conduction control terminal. In the apparatus, it is determined whether or not voltage at the conduction control terminal is at a first voltage which is lower than a second voltage and which is equal to or more than a threshold voltage. The second voltage is a voltage provided when the switching element is in a normal on-state thereof. The threshold voltage is voltage at which the switching element is switched on. When it is determined that the voltage at the conduction control terminal is at the first voltage, the switching element is forcibly switched off.

14 Claims, 8 Drawing Sheets

APPARATUS FOR DRIVING VOLTAGE CONTROLLED SWITCHING ELEMENTS

CROSS-REFERENCE TO RELATED APPLICATION

This application is based on and claims the benefit of priority from earlier Japanese Patent Application No. 2010-169944 filed Jul. 29, 2010, the description of which is incorporated herein by reference.

BACKGROUND OF THE INVENTION

1. [Technical Field of the Invention]

The present invention relates to an apparatus for driving switching elements, and more particularly to the apparatus for driving the voltage-controlled switching elements.

2. [Related Art]

It is known that this type of driving device is installed in a vehicle to drive switching elements configuring an inverter which is connected to an on-vehicle main device. For example, as disclosed in JP-A-2009-060358, this type of driving device has a function of shutting down an inverter when the current flowing through switching elements which are driven becomes equal to or more than a threshold current.

The reason why the current flowing through switching elements becomes equal to or more than a threshold current is that the voltage applied to its conduction control terminal is set to a high level. Specifically, in this case, the current in a non-saturated area exceeds the threshold current. This is a configuration for reducing loss of the switching elements.

The voltage applied to switching elements may be reduced when some sort of failure occurs in the driving device. In such a case, loss of the switching elements may become large and, further, drastic temperature rise may be caused accompanying generation of heat. However, depending on the function of shutdown, for example, such a failure may not be handled because the current passing through the switching elements is maintained at a level equal to or less than a threshold.

SUMMARY

Hence, it is desired to provide a driving device for switching elements, which drives voltage-controlled switching elements and is able to favorably suppress inconveniences ascribed to electrical surge occurring at the conduction control terminals of the switching elements.

An exemplary embodiment provides an apparatus for driving a voltage controlled switching element having a conduction control terminal, comprising: voltage determining means for determining whether or not voltage at the conduction control terminal is at a first voltage which is lower than a second voltage and which is equal to or more than a threshold voltage, the second voltage being a voltage provided when the switching element is in a normal on-state thereof, the threshold voltage being voltage at which the switching element is switched on; and forcible switching-off means that forcibly switches off the switching element when it is determined by the voltage determining means that the voltage at the conduction control terminal is at the first voltage.

In this configuration, a switching element of voltage control type is forcibly switched off (turned off) on condition that the voltage of the conduction control terminal corresponds to the intermediate voltage. Accordingly, the switching element is prevented from being kept switched on (turned on) in a region where loss of the switching element is large. Thus, the inconveniences ascribed to the electrical surge occurring at the conduction control terminal may be favorably suppressed.

It is preferred that the forcible switching-off means is configured to forcibly switch off the switching element during a period of time other than a transition period during which the switching element is being switched to provide the second voltage in response to a switching-on command and a transition period during which the switching element is switched to provide a third voltage provided when the switching element is in a normal off-state thereof in response to a switching-off command, when it is determined by the voltage determining means that the voltage at the conduction control terminal is at the first voltage.

When the state of the switching element is switched to an on-state according to a switching-on command, the voltage of the conduction control terminal passes over the intermediate voltage. Also, when the state of the switching element is switched to an off-state according to a switching-off command, the voltage of the conduction control terminal passes over the intermediate voltage. From this view point in the above configuration, the forced switching-off operation is not carried out in the case where the voltage of the conduction control terminal coincides with the intermediate voltage during the transition period.

It is also preferred that he forcible switching-off means is configured to forcibly switch off the switching element during a period of time during which the switching-off command is given to the switching element but which is outside a transition period during which the switching element is switched to provide a third voltage provided when the switching element is in a normal off-state thereof in response to a switching-off command, when it is determined by the voltage determining means that the voltage at the conduction control terminal is at the first voltage.

When the state of the switching element is switched to an off-state according to a switching-off command, the voltage of the conduction control terminal passes over the intermediate voltage. From this view point in the above configuration, the forcible switching-off operation is not carried out in the case where the voltage of the conduction control terminal coincides with the intermediate voltage during the transition period.

Preferably, the forcible switching-off is configured to forcibly switch off the switching element during a period of time during which the switching-on command is given to the switching element but which is outside a transition period during which the switching element is switched to provide the second, when it is determined by the voltage determining means that the voltage at the conduction control terminal is at the first voltage.

When the state of the switching element is switched to an on-state according to a switching-on command, the voltage of the conduction control terminal passes over the intermediate voltage. From this view point in the above configuration, the forcible switching-off operation is not carried out in the case where the voltage of the conduction control terminal coincides with the intermediate voltage during the transition period.

Still preferably, the apparatus has a power supply that generates the second voltage, a charging path electrically connecting the conduction control terminal of the switching element and the power supply, a charging switching element that selectively opens and closes the charging path, a normal discharge path that discharges, from the conduction control terminal, electric charge which allow the switching element to be turn on, and a discharging switching element that selectively opens and closes the normal discharge path.

Still preferably, the apparatus has a soft-breaking discharge path which is higher in impedance than the normal discharge path, and a soft-breaking switching element that selectively opens and closes the soft-breaking discharge path, wherein the forcible switching-off means is configured to drive the soft-breaking switching element for the forcible switching-off operation.

In the above configurations, the soft-breaking discharge path is used to reduce the speed of switching the state of the switching element to an off-state. In this case, the occurrence of surge may be suppressed.

By way of example, the apparatus can have an off-state holding switching element that holds an off state of the switching element by short-circuiting an electrical connection between the conduction control terminal of the switching element and either an input terminal of an output terminal of the switching element, wherein the forcible switching-off means is configured to drive the off-state holding switching element for the forcible switching-off operation. In this configuration the off-state holding switching element is used to enhance the reliability of forced turn-off operation.

It is also preferred that the forcible switching-off means is configured to turn off the power supply for the forcible switching-off operation. In this configuration, the power supply is turned off to prevent electrical charges for turning on the switching element from being supplied to the conduction control terminal.

Preferably the forcible switching-off means is configured to switch off the charging switching element during a period of time during which the switching-on command is given to the switching element but which is outside a transition period during which the switching element is switched to provide the second voltage, when it is determined by the voltage determining means that the voltage at the conduction control terminal is at the first voltage.

Still preferably, the forcible switching-off means is configured to switch on the discharging switching element during a period of time during which the switching-on command is given to the switching element but which is outside a transition period during which the switching element is switched to provide the second voltage, when it is determined by the voltage determining means that the voltage at the conduction control terminal is at the first voltage.

Still preferably, the apparatus includes a member consisting of a plurality of zener diodes and a clamping switching element which are electrically connected in series with each other between the conduction control terminal of the switching element and either an input or an output terminal of the switching element, clamping control means for switching on the clamping switching element such that current flowing through the switching element becomes larger than a threshold current, which causes voltage at the conduction control terminal to be set to a specified voltage, and a bypass switching element electrically serially connected to part of the plurality of zener diodes and electrically parallely connected to a further member consisting of a remainder of the zener diodes and the clamping switching element which are electrically connected in series with each other, wherein the forcible switching-off means is configured to switch on the bypass switching element for the forcible switching-off operation.

Still preferably, the apparatus includes a soft-breaking discharge path which is higher in impedance than the normal discharge path, a soft-breaking switching element that selectively opens and closes the soft-breaking discharge path, and an off-state holding switching element that holds an off state of the switching element by short-circuiting an electrical connection between the conduction control terminal of the switching element and either an input terminal of an output terminal of the switching element, wherein the forcible switching-off means is configured to perform at least two of five operations for the forcible switching-off operation, the five operations including a switchover operation of the charging switching element from an on-state thereof to an off-state thereof, a switchover operation of the discharging switching element from an off-state thereof to an on-state thereof, a switching-on operation of the soft-breaking switching element, a switching-on operation of the off-state holding switching element, and a turn-off operation of the power supply.

Still preferably, the apparatus which includes the switching element is composed of each of a high-potential-side switching element and a low-potential-side switching element which are provided as a pair of switching elements, the pair of switching elements are controlled to repeat first and second switched states at intervals, the first switched state allowing one of the paired switching elements to be switched on and the other switching element to be switched off, the second switched state allowing the one switching element to be switched off and the other switching element to be switched on, the apparatus includes fail safe performing means that forcibly switches off both the switching elements of the pair of switching elements when current flowing through at least one of the paired switching elements becomes equal to or greater than a threshold, and the forcible switching-off means is configured to make the fail safe performing means operative for the forcible switching-off operation, by changing an output voltage of the power supply so that a value of the first voltage is shifted to a value of the second voltage.

The failure in which the voltage of the conduction control terminal coincides with the intermediate voltage may include a failure in which the voltage of the conduction control terminal is constantly maintained at the intermediate voltage, irrespective of whether the operation signal of the switching element is a switching-on command or a switching-off command. Meanwhile, a pair of switching elements are alternately switched on, causing a state where both of the switching elements are in an on-state. However, in the failure as mentioned above, since the voltage of the conduction control terminal is at the level of the intermediate voltage, the current passing through the switching element is unlikely to become equal to or higher than a threshold current.

in this regard, in this configuration, the voltage of the conduction control terminal is permitted to transit to the side of normal on-state voltage. Accordingly, the current passing through the switching element is made equal to or higher than the threshold current when both of the switching elements are in an on-state.

By way of example, the apparatus can include notification means so that issues a notice showing that the forcible switching-off operation is performed. The object to be informed of the forced turn-off operation may be a generating means that generates an operation signal for a switching element.

It is preferred that the apparatus which includes the switching element is composed of each of a high-potential-side switching element and a low-potential-side switching element which are provided as a pair of switching elements, the switching element is composed of each of a high-potential-side switching element and a low-potential-side switching element which are provided as a pair of switching elements, the pair of switching elements are controlled to repeat first and second switched states at intervals, the first switched state allowing one of the paired switching elements to be switched on and the other switching element to be switched off, the second switched state allowing the one switching element to be switched off and the other switching element to be switched on, and the second voltage permits the switching element to be driven in a non-saturated region thereof with drive current which is greater than the threshold current.

The failure in which the voltage of the conduction control terminal coincides with the intermediate voltage may include a failure in which the voltage of the conduction control terminal is constantly maintained at the intermediate voltage, irrespective of whether the operation signal of the switching element is a switching-on command or a switching-off command. Meanwhile, a pair of switching elements are alternately switched on, causing a state where both of the switching elements are in an on-state. However, in the failure as mentioned above, since the voltage of the conduction control terminal is at the level of the intermediate voltage, the current passing through the driven switching element is unlikely to become equal to or higher than a threshold current.

In this regard, in the configuration, a determining means and a turn-off operation means are provided to handle such a situation.

DETAILED DESCRIPTION OF THE PREFERRED EMBODIMENTS (First Embodiment)

With reference to the accompanying drawings, hereinafter are described some embodiments of a driving device for switching elements of the present invention. Referring first to FIGS. 1 to 4 and FIG. 5, a first embodiment of the present invention is described. In the first embodiment described below, the driving device for switching elements is applied to each driving device used in an inverter connected to a rotary machine as an on-vehicle main device.

Figure 1:
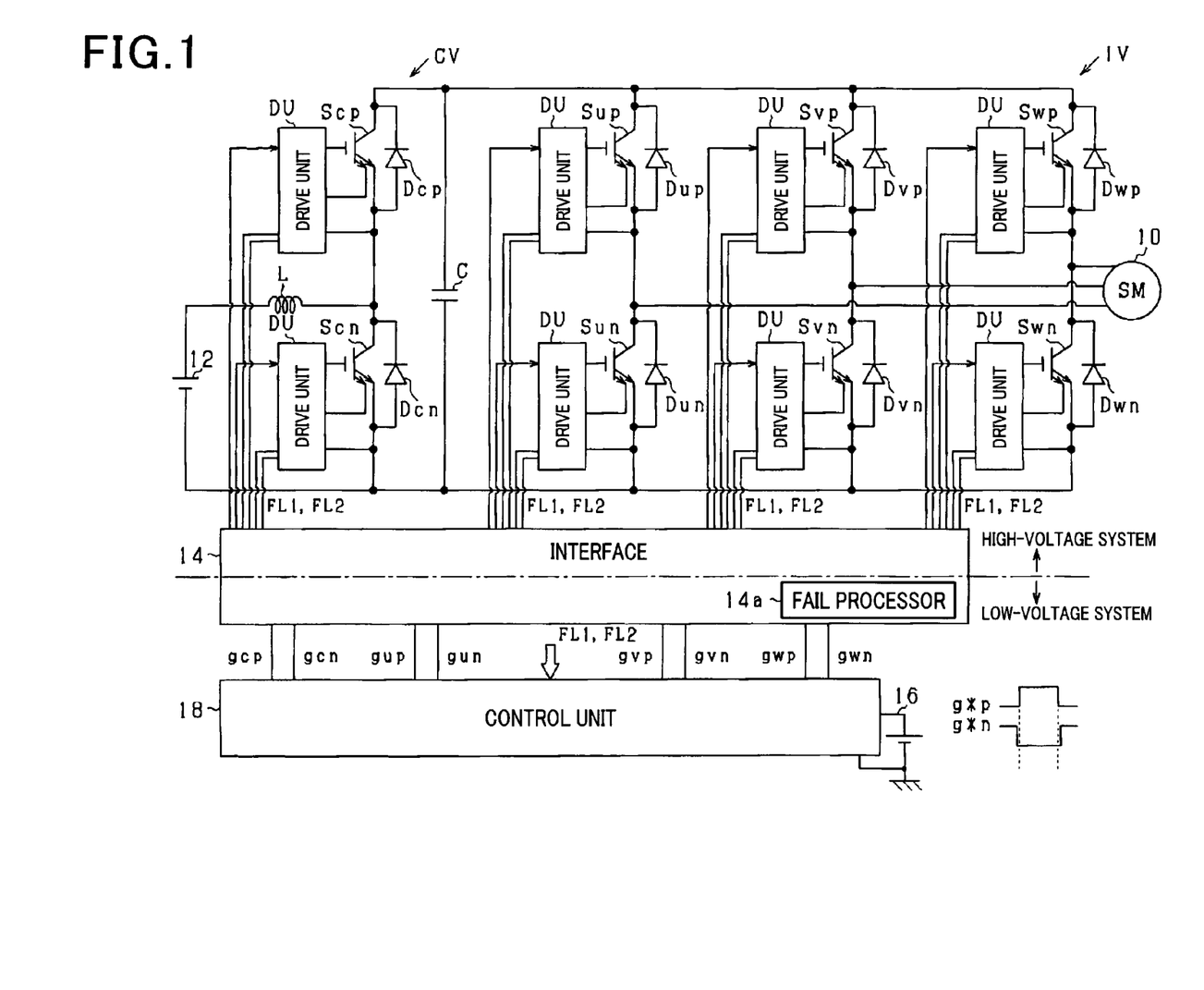
FIG. 1 is a schematic diagram illustrating a system according to a first embodiment of the present invention.

FIG. 1 is a general configuration of a control system according to the first embodiment. A motor generator 10 is an on-vehicle main device which is mechanically connected to drive wheels, not shown, of the vehicle. The motor generator 10 is connected to a high-voltage battery 12 via an inverter IV and a step-up converter CV, The step-up converter CV includes a capacitor C, a pair of switching elements Scp and Scn connected parallel to the capacitor C, and a reactor L that connects a node of the pair of switching elements Scp and Scn to a positive pole of the high-voltage battery 12. When the switching elements Scp and Scn are switched on/off (turned on/off), the voltage (e.g., 288 V) of the high-voltage battery 12 is stepped up, with a predetermined voltage (e.g., 666 V) as being an upper limit.

The inverter IV includes a serially-connected body of switching elements Sup and Sun, a serially-connected body of switching elements Svp and Svn, and a serially-connected body of switching elements Swp and Swn. These serially-connected bodies have respective nodes which are connected to U, V and W phases of the motor generator 10.

In the present embodiment, insulated gate bipolar transistors (IGBTs) are used as the switching elements Sup, Sun, Svp, Svn, Swp, Swn, Scp and Scn. The switching elements Sup, Sun, Svp, Svn, Swp, Swn, Scp and Scn are in inverse-parallel connection with diodes Dup, Dun, Dvp, Dvn, Dwp, Dwn, Dcp and Dcn, respectively.

The control system includes a control unit 18 which uses a low-voltage battery 16 as a power supply. The control unit 18 controls the motor generator 10 that is a controlled object. The control unit 18 operates the inverter IV and the converter CV such that a controlled variable of the motor generator 10 is controlled to a desired level. Specifically, the control unit 18 outputs operation signals gcp and gcn to respective drive units DU to operate the switching elements Scp and Scn of the converter CV. The control unit 18 outputs operation signals gup, gun, gyp, gvn, gwp and gwn to respective drive units DU to operate the switching elements Sup, Sun, Svp, Svn, Swp and Swn of the inverter IV. The operation signals gcp, gup, gyp and gwp on a high-potential side and the corresponding operation signals gcn, gun, gvn and gwn on a low-potential side are rendered to be mutually complementary. In other words, the operation signals gcp, gup, gyp and gwp on the high-potential side and the corresponding operation signals gcn, gun, gvn and gwn on the low-potential side are alternately switched on.

The inverter IV, the step-up converter CV and the high-voltage battery 12 constitute a high-voltage system, while the control unit 18 and the low-voltage battery 16 constitute a low-voltage system. The high-voltage system and the low-voltage system are mutually insulated. Signals are transmitted/received between these systems via an interface 14 having an insulating element, such as a photocoupler.

Figure 2:
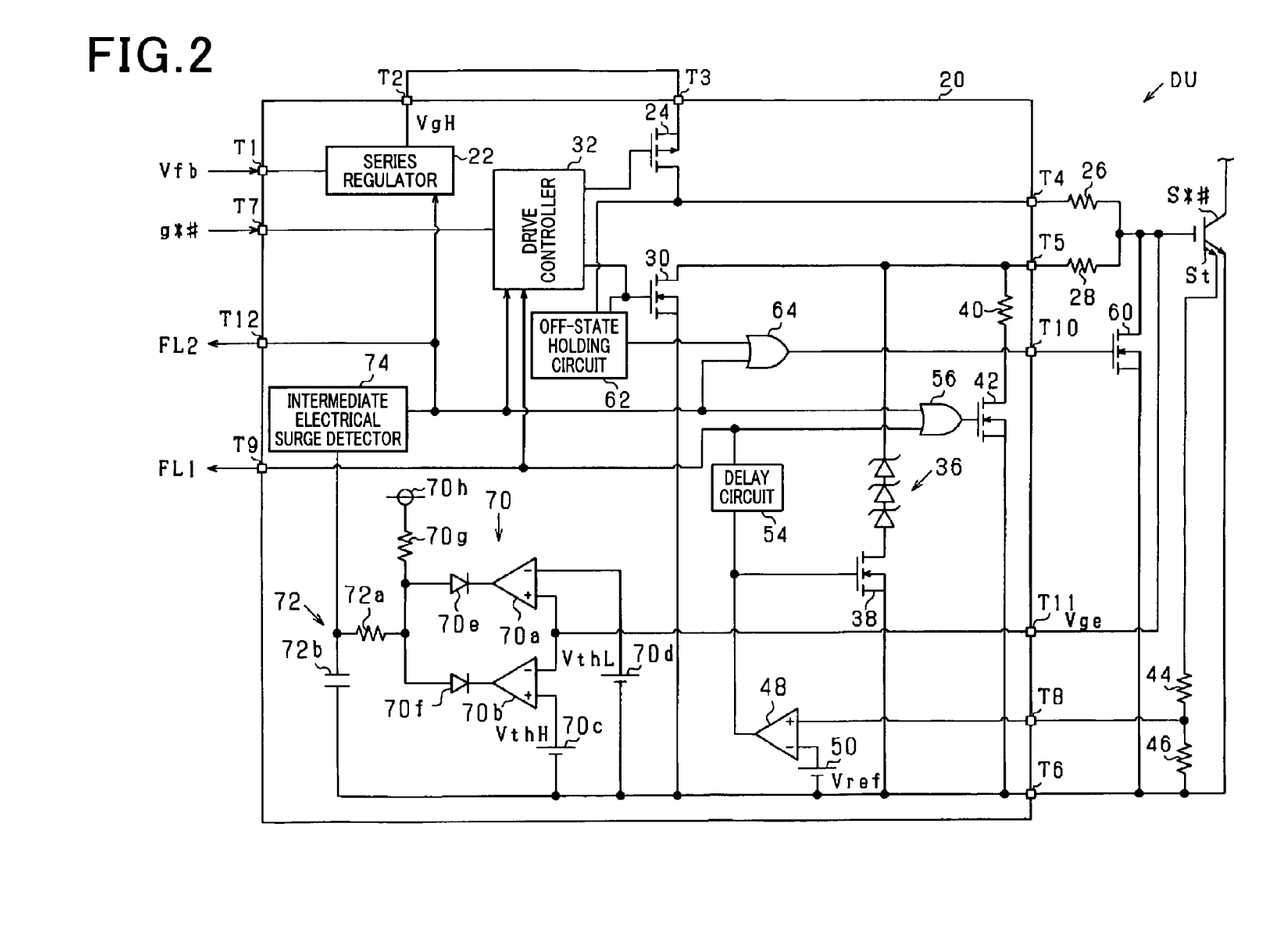
FIG. 2 is a circuit diagram illustrating a circuit configuration of a drive unit according to the first embodiment.

FIG. 2 illustrates a configuration of one of the drive units DU mentioned above.

As shown in FIG. 2, the drive unit DU includes a drive IC 20 that is a single-chip semiconductor integrated circuit. The drive IC 20 has a terminal T1 to which a voltage Vfb of a power supply of the drive unit DU is applied. It should be appreciated that this power supply may be a flyback converter that converts the electric power of the low-voltage battery 16.

The voltage Vfb is stepped down by a series regulator 22, for use as a voltage (gate application voltage VgH) to be applied to a conduction control terminal (gate) of a switching element S*# (*=u, v, w or c; #=p or n). The series regulator 22 has an output terminal connected to an input terminal of a charging switching element 24 via terminals T2 and T3 of the drive IC 20. The charging switching element 24 has an output terminal connected to a terminal T4 of the drive IC 20. The terminal T4 is connected to the gate of the switching element S*# via a charging resistor 26.

The gate of the switching element S*# is connected to a terminal T5 of the drive IC 20 via a discharging resistor 28. The terminal T5 is connected to a terminal T6 via a discharging switching element 30. The terminal T6 is connected to an output terminal (emitter) of the switching element S*#.

The charging switching element 24 and the discharging switching element 30 are operated by a drive controller 32 in the drive IC 20. Specifically, the drive controller 32 complementarily turns on/off the charging switching element 24 and the discharging switching element 30 based on an operation signal g*# inputted via a terminal T7 to drive the switching element S*#. More specifically, when the operation signal g*# is a switching-on command, the charging switching element 24 is switched on while the discharging switching element 30 is switched off. When the operation signal g*# is a switching-off command, the charging switching element 24 is switched off while the discharging switching element 30 is switched on.

The terminal T5 is also connected to the terminal T6 via a serially-connected body of Zener diodes 36 and a clamping switching element 38. The Zener diodes 36 have a breakdown voltage which limits the gate voltage of the switching element S*# to an extent that undue current will not be passed through the switching element S*#.

The terminal T5 is further connected to the terminal T6 via a soft-breaking resistor 40 and a soft-breaking switching element 42.

The switching element S*# includes a sensing terminal St that outputs a minute current correlated to the current (collector current) passing between an input terminal (collector) and the output terminal (emitter) of the switching element S*#. The sensing terminal St is electrically connected to the emitter via a serially-connected body of resistors 44 and 46. Thus, the voltage of the resistor 46 is dropped by the current outputted from the sensing terminal St. As a result, the quantity of voltage drop caused by the resistor 46 is rendered to be an electric state quantity correlated to the current passing between the input terminal and the output terminal of the switching element S*#.

The quantity of voltage drop caused in the resistor 46 is introduced to a non-inverting input terminal of a comparator 48 via a terminal T8. The non-inverting input terminal of the comparator 48 is applied with a reference voltage Vref of a reference power supply 50. Thus, when the collector current becomes equal to or higher than a threshold current, an output signal of the comparator 48 is inverted from logic "L" to logic "H". The signal of logic "H" outputted from the comparator 48 is applied to the clamping switching element 38, while being introduced to a delay circuit 54. The delay circuit 54 outputs a fail signal FL1 when input signals indicate logic "H" over a predetermined period of time. The fail signal FL1 turns on the soft-breaking switching element 42 to forcibly turn off the switching element S*#, or gives a command to the drive controller 32. to stop driving of the charging switching element 24 and the discharging switching element 30.

According to the configuration as described above, when overcurrent passes through the switching element S*#, the clamping switching element 38 is switched on first and, accompanying which, the Zener diodes 36 are switched on, whereby the gate voltage of the is switching element S*# is decreased. Thus, the current passing through the switching element S*# is limited. After that, when overcurrent continues for a predetermined period of time, the soft-breaking switching element 42 is switched on to thereby forcibly turn off the switching element S*#.

In this way, when the collector current becomes equal to or higher than a threshold and this state is continued for a predetermined period of time or more the soft-breaking switching element 42 is switched on and then electrical charges at the gate of the switching element S*# are discharged via the soft-breaking resistor 40 and the discharging resistor 28. The soft-breaking resistor 40 is used for increasing resistance of a discharge path. Under the conditions where collector current is undue, the electrical surge is likely to be undue when the speed of switching the switching element S*# from an on-state to an off-state is increased, or in other words, when the breaking speed between the collector and the emitter is increased.

The soft-breaking resistor 40 is used to cope with such a probability of occurring undue electrical surge. Thus, under the conditions where collector current is determined to become equal to or higher than a threshold, electrical charges at the gate of the switching element S*# are discharged through a path having a larger resistance than the discharge path that includes the discharging resistor 28 and the discharging switching element 30.

The fail signal FL1 is outputted to the low-voltage system (control unit 18) via a terminal T9. A fail processor 14a included in the control system shown in FIG. 1 uses the fail signal FL1 to shut down the inverter IV and the converter CV. The fail processor 14a may be configured, for to example, as shown in FIG. 3 of JP-A-2009-060358.

The drive unit DU described above further includes an N-channel MOSFET (metal-oxide semiconductor field-effect transistor) (off-state holding switching element 60) for causing short-circuit between the gate and the emitter of the switching element S*#. The off-state holding switching element 60 is provided being located as close as possible to the switching element S*# so that the gate and the emitter of the switching element S*# are connected with low resistance, In a path that connects the gate and the emitter of the switching element S*#, a part including the off-state holding switching element 60 is permitted to have an impedance lower than the impedance of a part including the discharging resistor 28. When the switching element S*# is in an off-state in response to the operation signal g*#, high-frequency noise may be superimposed on the gate via parasitic capacitance between the input terminal (collector) or the output terminal (emitter) and the gate of the switching element S*# to erroneously turn on the switching element S*#. In this regard, owing to the low setting of the impedance as mentioned above, the switching element S*# is prevented from being erroneously switched on.

The off-state holding switching element 60 has a gate connected to an off-state holding circuit 62 in the drive IC 20 via a terminal T10. The off-state holding circuit 62 monitors the gate voltage of the switching element S*# based on the voltage applied to the terminal T4. When the applied voltage becomes equal to a predetermined voltage, the off-state holding circuit 62 turns on the off-state holding switching element 60. The off-state holding circuit 62 also monitors signals outputted from the drive controller 32 to the gate of the discharging switching element 30 and turns off the off-state holding switching element 60 synchronizing with the timing when the discharging switching element 30 is switched off.

Figure 3:
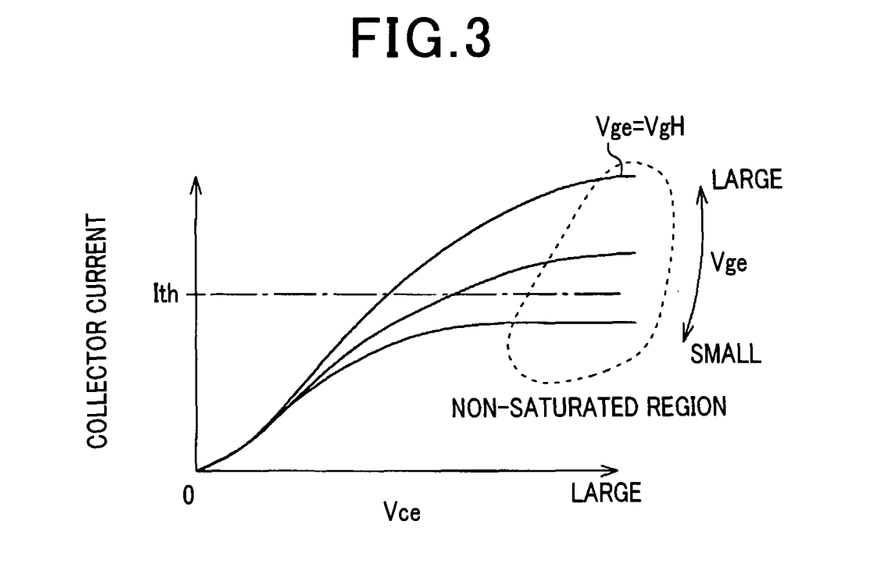
FIG. 3 is a diagram illustrating a relationship of gate voltage relative to collector current and collector-emitter voltage.

A relationship as shown in FIG. 3 is established between the voltage across the input and output terminals of the switching element S*# (collector-emitter voltage Vce) and collector current Specifically, in general, in the case where the switching element S*# is not driven in a non-saturated region, the collector-emitter voltage Vce is increased as the collector current Ic becomes higher. Also, the collector-emitter voltage Vce is decreased as the gate voltage Vge is increased. Meanwhile, in the non-saturated region, the collector current Ic stays at a constant level in conformity with the gate voltage Vge.

In the present embodiment, the applied gate voltage VgH (=Vge) is set to a high level to drive the switching element S*# in a saturated region, whereby loss of the switching element S*# is reduced. Accordingly, the current in the non-saturated region becomes higher than a threshold current Ith. This is the reason why overcurrent could flow through the switching element S*#. It should be appreciated that the breakdown voltage of the Zener diodes 36 is set to a level that would allow the current of the switching element S*# in the non-saturated region to become slightly higher than the threshold current Ith.

The switching element S*# may have a failure in which the voltage applied to the switching element S*# becomes smaller than the intrinsic output voltage (applied gate voltage VgH) of the series regulator 22. In this case, loss of the switching element S*# is likely to become unexpectedly large. Such a failure could be caused by the following factors, for example.

1. Occurrence of a failure in which the discharging switching element 30 does not turn to an on-state:

In this case, the electrical charges at the gate are merely gradually discharged via a resistor (not shown), for example, connecting between the gate and the emitter, even when the charging switching element 24 is switched to an off-state.

2. Occurrence of a failure in which the discharging switching element 30 stays in a conducting state:

In this case, when the charging switching element 24 is switched on, the output voltage of the series regulator 22, being divided by the charging resistor 26 and the discharging resistor 28, is applied to the gate 3. Occurrence of a failure in the switching element S*# per se:

For example, the gate voltage Vge may become abnormal due to leak current such as between the gate and the collector.

4. Occurrence of a failure in the series regulator 22 per se:

When such a failure occurs, the gate voltage Vge may be decreased.

5. Occurrence of short circuit between the terminals T3 and T4:

In this case, when the discharging switching element 30 is switched on, the output voltage of the series regulator 22, being divided by the charging resistor 26 and the discharging resistor 28, is applied to the gate.

In the event such failures occur, loss of the switching element S*# is increased and thus the temperature tends to be drastically raised. In such a case, the temperature rise may not be timely handled by a protecting means (not shown) having a function of turning off the switching element S*# when temperature becomes equal to or higher than a threshold temperature. In particular, in the event failures occur due to the above factors 1 and 5, the operation signal g*# as a switching-off command is given. In this case, current should have originally flowed through only a reverse arm, but, instead, short-circuit current flows through upper and lower arms. As a result, the speed of temperature rise tends to be accelerated. Meanwhile, the short-circuit current may not reach the threshold current Ith due to the gate voltage Vge set to a low level. In this case, the overcurrent protecting means may not be operated.

Figure 4:
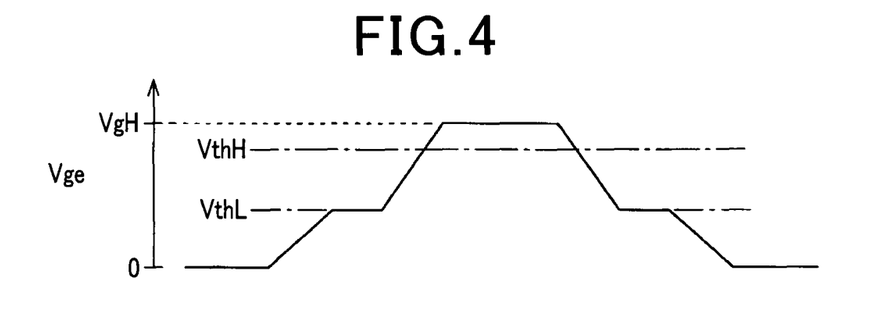
FIG. 4 is a time diagram illustrating a transition of the gate voltage.

In this regard, as shown in FIG. 4, the present embodiment uses the intermediate voltage as a basis of making a determination on the occurrence of a failure. Specifically, the intermediate voltage is equal to or larger than the voltage that allows the switching element S*# to be switched on but smaller than the intrinsic output voltage (applied gate voltage VgH) of the series regulator 22. In the present embodiment, when the voltage is continuously at a level of the intermediate voltage, intermediate electrical surge is determined as having occurred. More specifically, when the voltage at the gate of the switching element S*# is equal to or larger than a low-voltage side threshold VthL which allows the switching element S*# to be switched on, but is equal to or smaller than a high-voltage side threshold VthH which is set to a voltage smaller than the applied gate voltage VgH, the occurrence of intermediate electrical surge is determined.

Specifically, as shown in FIG. 2, the gate voltage Vge is applied, via a terminal T11, to a window comparator 70 that detects the intermediate voltage. The window comparator 70 includes a comparator 70a and a comparator 70b. The comparator 70a compares the gate voltage Vge with an output voltage (low-voltage side threshold VthL) of a power supply 70d. The comparator 70b compares the gate voltage Vge with an output voltage (high-voltage side threshold VthH) of a power supply 70c. The comparators 70a and 70b have respective output terminals to which respective cathodes of diodes 70e and 70f are connected. The diodes 70e and 70f have respective anodes which are pulled up by a power supply 70h via a resistor 70g. The pulled up anodes serve as an output terminal of the window comparator 70. An output signal of the window comparator 70 will indicate logic "H" when the gate voltage Vge turns to the intermediate voltage that falls between the low-voltage side threshold VthL and the high-voltage side threshold VthH.

The output terminal of the window comparator 70 is routed to an intermediate electrical surge detector 74 via a CR circuit (lowpass filter 72) which is configured by a resistor 72a and a capacitor 72b. The lowpass filter 72 is set with a time constant so that inputted voltage would not be outputted even when the inputted voltage is inverted to logic "H" for a short period of time. The short period of time includes, as shown in FIG. 4, the period when the voltage at the gate transitionally turns to the intermediate voltage when the switching element S*# is switched to an on-state, or the period when the voltage at the gate transitionally turns to the intermediate voltage when the switching element S*# is switched to an off-state.

it should be appreciated that if the inputted voltage is determined to indicate logic "H" during a short period of time when the inputted voltage is removed by the delay circuit 54, the lowpass filter 72 will not output the inputted voltage. Meanwhile, the intermediate electrical surge detector 74 outputs a fail signal FL2 when the intermediate voltage is detected over a period of time longer than the period when the inputted voltage indicates logic "H" corresponding to the transitional intermediate voltage at the time of switch to an on-state or off-state.

The fail signal FL2 turns on the soft-breaking switching element 42 via an OR circuit 56, or turns on the off-state holding switching element 60 via an OR circuit 64. Further, the fail signal FL2, when it is inputted to the drive controller 32, turns off the charging switching element 24 and at the same time turns on the discharging switching element 30. Also, the fail signal FL2 turns off the series regulator 22. When the fail signal FL2 is outputted to the side of the low-voltage system (control unit 18) via a terminal T12, the occurrence of the intermediate electrical surge is notified to the low-voltage system.

Figure 5:
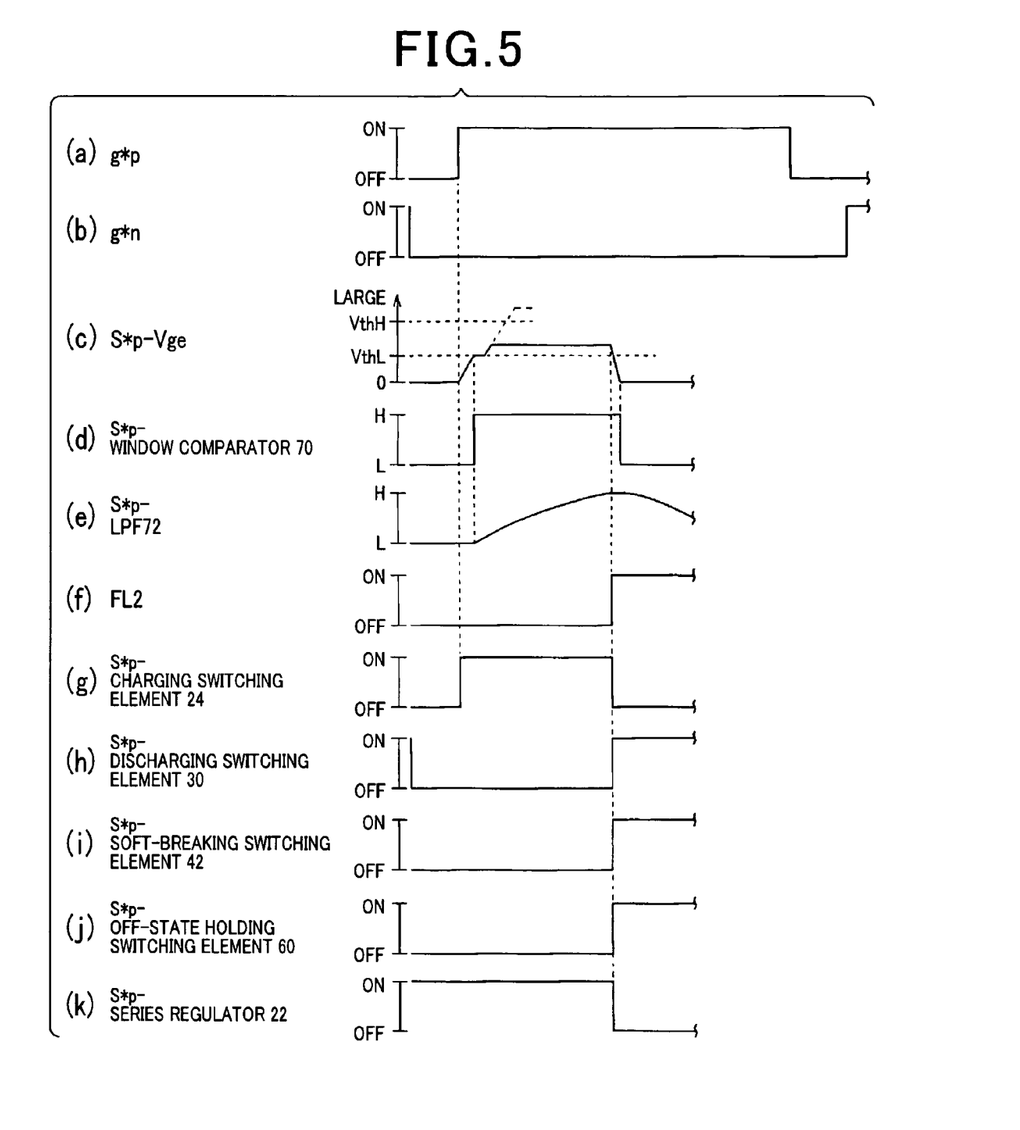
FIG. 5 is a time diagram illustrating a forced turn-off operation according to the first embodiment.

FIG. 5 illustrates a failsafe process concerning the intermediate electrical surge, according to the present embodiment. Specifically, FIG. 5(a) illustrates transition of an operation signal g*p for a high-potential-side switching element S*p. FIG. 5(b) illustrates transition of an operation signal g*n for a low-potential-side switching element S*n. FIG. 5(c) illustrates transition of the gate voltage Vge of a high-potential-side switching element S*p. FIG. 5(d) illustrates transition of an output signal of the window comparator 70 for a high-potential-side switching element S*p. FIG. 5(e) illustrates transition of an output voltage of the lowpass filter 72 for a high-potential-side switching element S*p, FIG. 5(f) illustrates transition of the fail signal FL2. FIG. 5(g) illustrates state transition of the charging switching element 24 for a high-potential-side switching element S*p. FIG. 5(h) illustrates state transition of the discharging switching element 30 for a high-potential-side switching element S*p. FIG. 5(i) illustrates state transition of the soft-breaking switching element 42 for a high-potential-side switching element S*p. FIG. 5(j) illustrates state transition of the off-state holding switching element 60 for a high-potential-side switching element 5*p. FIG. 5(k) illustrates state transition of the series regulator 22 for a high-potential-side switching element S*p.

As shown in these figures, when the operation signal g*p is switched to a switching-on command, the gate voltage Vge of the switching element S*p on the high-potential side increases, but stays at a level of the intermediate voltage without being increased to an output voltage (applied gate voltage VgH) outputted by the series regulator 22 in normal operation. In this case, a state where the output signal of the window comparator 70 indicates logic "H" is continued, so that the output voltage of the lowpass filter 72 also turns to logic "H". This allows the fail signal FL2 to rise and turn on the discharging switching element 30, the soft-breaking switching element 42 and the off-state holding switching element 60, and to turn off the charging switching element 24 and the series regulator 22.

According to the present embodiment specifically described above, the following advantages are obtained.

(1) The switching element S*# is switched off irrespective of the command of the operation signal g*#, on condition that the gate voltage coincides with the intermediate voltage over a period of time, excluding the transition period when the switching element S*# is switched to an on-state according to a switching-on command or turns to an off-state according to a switching-off command. Thus, the intermediate electrical surge is favorably handled.

(2) When the intermediate electrical surge is detected, the discharging switching element 30, soft-breaking switching element 42 and off-state holding switching element 60 are switched on, while the charging switching element 24 and the series regulator 22 are switched is off. Thus, in the event a failure occurs in any one of these elements to be operated, the switching element S*# is promptly and reliably switched off.

(3) When the intermediate electrical surge is detected, an external unit is informed accordingly (fail signal FL2 is outputted). Thus, the occurrence of the failure may be notified to the user.

(Second Embodiment)

Figure 6:
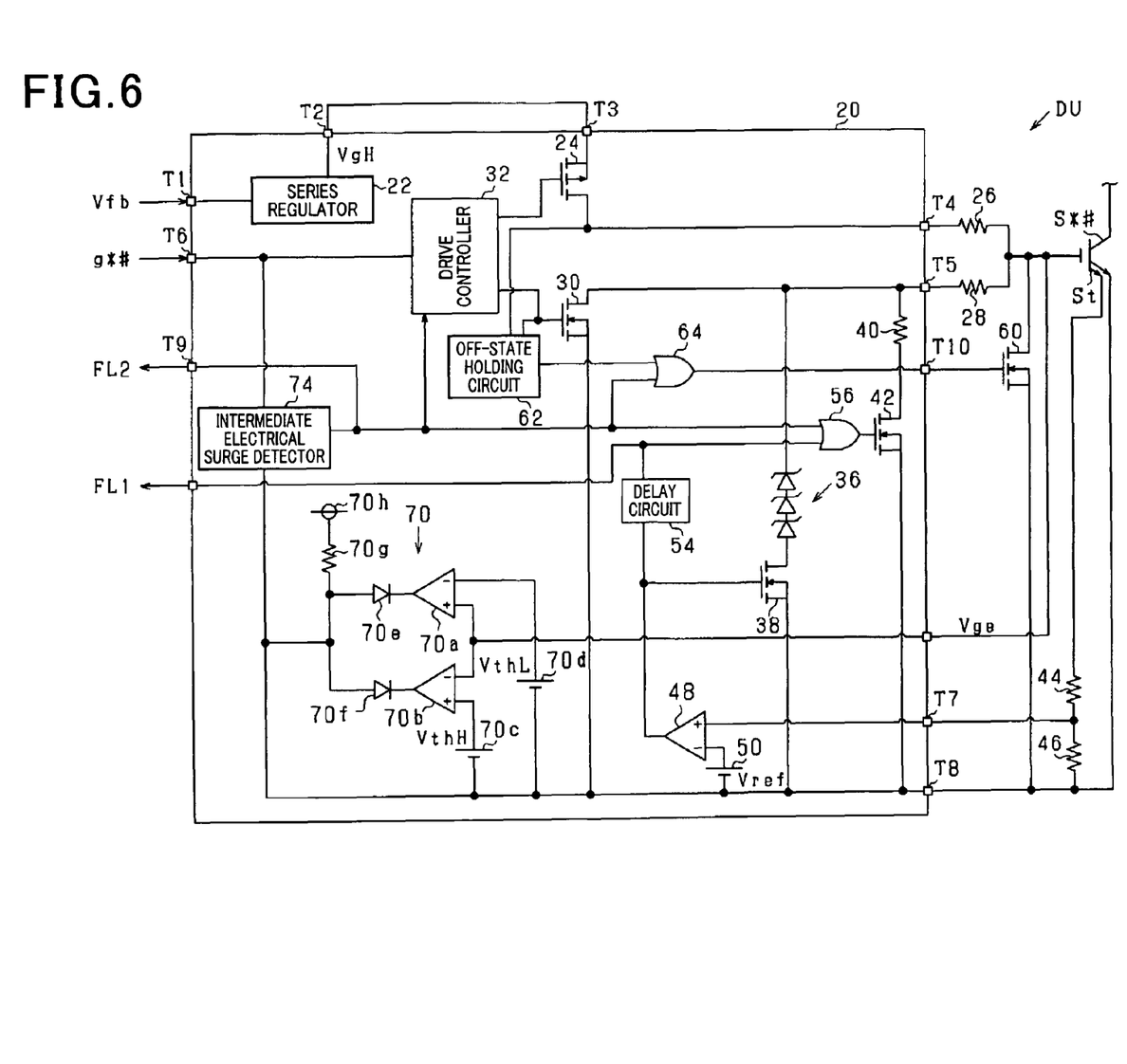
FIG. 6 is a circuit diagram illustrating a circuit configuration of a drive unit according to a second embodiment of the present invention.
Figure 7:
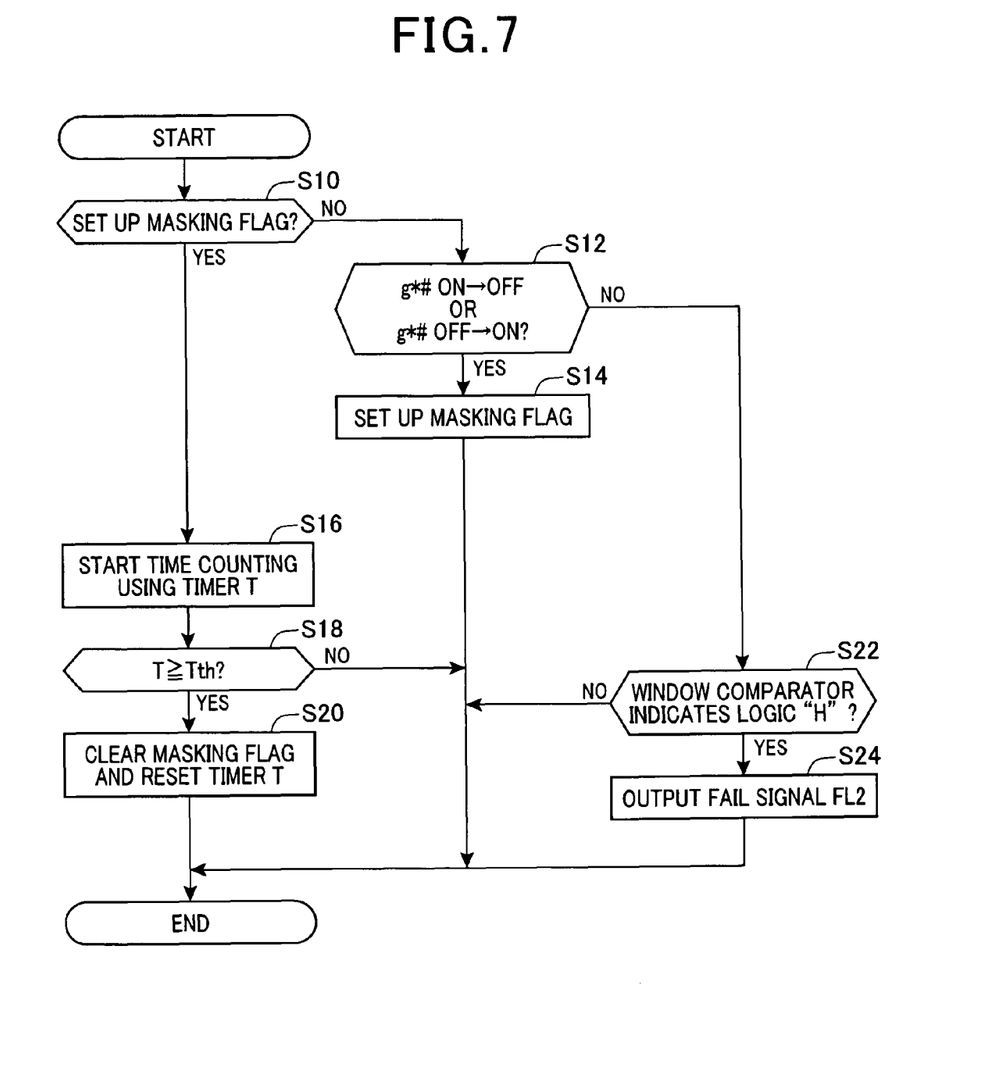
FIG. 7 is a flow diagram illustrating steps of detecting intermediate electrical surge, according to the second embodiment.

Referring now to FIGS. 6 and 7, hereinafter is described a second embodiment of the present invention, focusing on the differences from the first embodiment described above. It should be appreciated that, in the second and the subsequent embodiments, the components identical with or similar to those in the first embodiment are given the same reference numerals for the sake of omitting unnecessary explanation.

FIG. 6 illustrates a configuration of a drive unit DU according to the second embodiment.

As shown in FIG. 6, in the present embodiment, an output signal of the window comparator 70 is directly inputted to the intermediate electrical surge detector 74. The intermediate electrical surge detector 74 determines the occurrence or non-occurrence of intermediate electrical surge based on the output signal of the window comparator 70 and the operation signal g*#.

FIG. 7 illustrates a procedure, i.e. a series of steps, performed by the intermediate electrical surge detector 74. For example, these steps are repeatedly performed at a predetermined cycle.

First at step S10 of the series of steps, it is determined whether or not a masking flag that inhibits detection of intermediate electrical surge is set up. If a "NO" determination is made, control proceeds to step S12 where it is determined whether or not a logical OR is true, the logical OR being a logical sum of a logic at the time when the command of the operation signal g*# is switched from a switching-on command to a switching-off command and a logic at the time when the command of the operation signal g*# is switched from a switching-off command to a switching-on command. If a "YES" determination is made at step S12, control proceeds to step S14 where the masking flag is set up.

On the other hand, if a "YES" determination is made at step S10, control proceeds to step S16 where time-counting operation is started by a timer T to count time for a masking period. At the subsequent step S18, it is determined whether or not the count of the timer T is equal to or more than a threshold Tth. If a "YES" determination is made at step S18, control proceeds to step S20 where the masking flag is cleared and the timer T is reset.

On the other hand, if a "NO" determination is made at step S12, control proceeds to step S22 where it is determined whether or not the output signal of the window comparator 70 indicates logic "H". Then, if a "YES" determination is made at step S22, control proceeds to step S24 where the fail signal FL2 is outputted.

When the process at step S14, S20 or S24 is completed, or if a "NO" determination is made at step S18 or S22, the series of steps is once ended.

(Third Embodiment)

Figure 8:
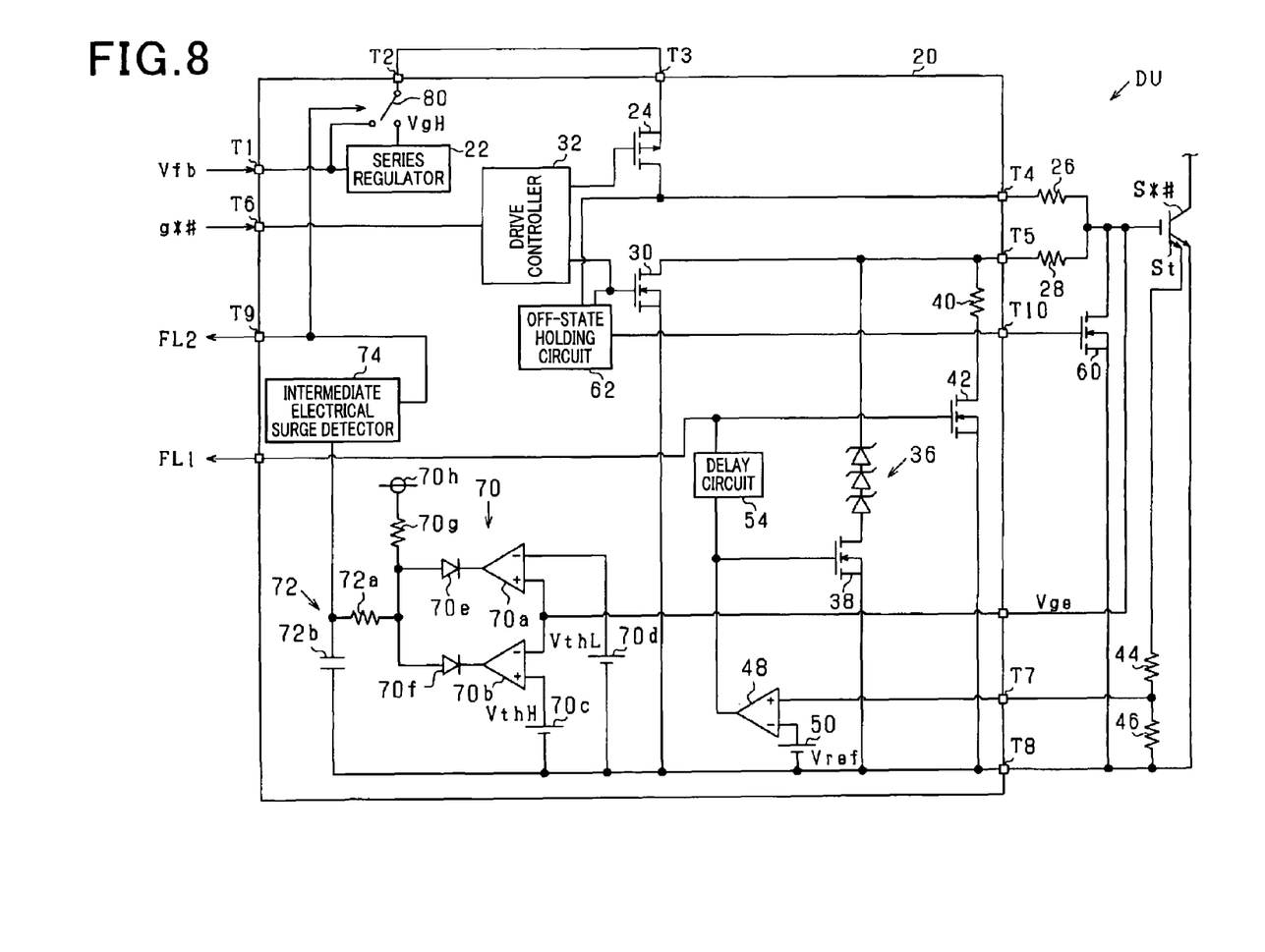
FIG. 8 is a circuit diagram illustrating a circuit configuration of a drive unit according to a third embodiment of the present invention.

Referring to FIG. 8, hereinafter is described a third embodiment of the present invention, focusing on the differences from the first embodiment described above.

FIG. 8 illustrates a configuration of a drive unit DU according to the third embodiment.

As shown in FIG. 8, the drive unit DU of the present embodiment includes a switch 80. The switch 80 switches the voltage applied to the gate of the switching element S*#, between an output voltage of the series regulator 22 and an input voltage of the series regulator 22. The switched condition is operated by the fail signal FL2. Specifically, when the fail signal FL2 is inputted, the voltage applied to the gate of the switching element S*# is switched to an input voltage of the series regulator 22.

Thus, when the gate voltage Vge is increased, the intermediate electrical surge will be eliminated. Accordingly, if the cause of the intermediate voltage is ascribed to factors 1 and 5 set forth above, both of a low-potential-side switching element S*n and a high-potential-side switching element S*p are switched on to pass through-current. In this case, the fail signal FL1 is outputted to shut down the inverter IV.

(Fourth Embodiment)

Figure 9:
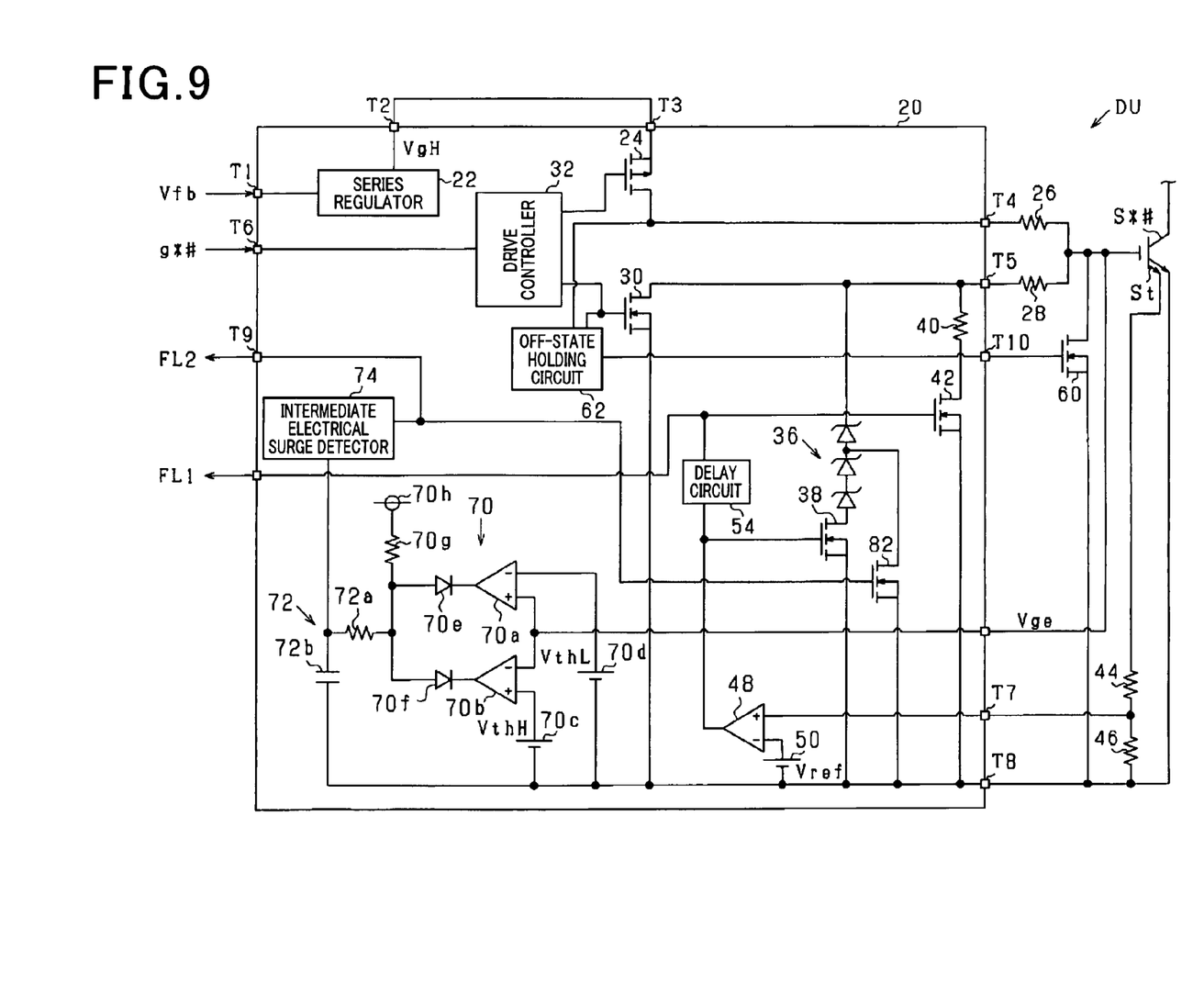
FIG. 9 is a circuit diagram illustrating a circuit configuration of a drive unit according to a fourth embodiment of the present invention.

Referring to FIG. 9, hereinafter is described a fourth embodiment, focusing on the differences from the first embodiment described above.

FIG. 9 illustrates a configuration of a drive unit DU according to the fourth embodiment.

As shown in FIG. 9, in the present embodiment, a bypass switching element 82 is connected parallel to a part of the Zener diodes 36 and the clamping switching element 38. When the fail signal FL2 is outputted, the bypass switching element 82 is switched on to turn off the switching element S*#.

(Modifications)

The embodiments described may be modified and implemented as follows.

The determining means that determines whether or not the intermediate voltage is caused is not limited to the one configured by an analogue circuit including a window comparator or the like. For example, the determining means may have a configuration in which the gate voltage Vge is converted to digital data by an A/D converter for digital processing, to thereby determine whether or not the intermediate voltage is caused.

The determining means is not limited to the one in which the voltage between the charging and discharging resistors 26 and 28, and the gate is used as the gate voltage Vge. For example, the determining means may use the voltage of the terminal T4 as the gate voltage Vge when the charging switching element 24 is in an off-state. However, this may cause a failure in which, irrespective of the turn-off operation of the charging switching element 24, the charging switching element 24 is in fact in an on-state, which may further induce a failure of the intermediate voltage. If there is a probability of the occurrence of such failures, it is desirable to use the voltage between the charging and discharging resistors 26 and 28, and the gate as the gate voltage Vge, in detecting the intermediate voltage.

The generating means that generates a masking period is not limited to the one exemplified in the above embodiments. For example, the generating means may have a configuration in which the voltage of the terminal T11 is applied to the lowpass filter and an output signal of the lowpass filter is inputted to the window comparator. Further, in the configuration in which a masking period is generated in an analogue circuit as well, a masking period may further be set in the intermediate electrical surge detector 74 based on the operation signal g*#, using digital processing in a manner taught in the second embodiment described above.

In the case where the operation signal *# is inputted as well, a masking period may be generated by an analogue circuit.

The means used for forced turn-off operation is not limited to the one exemplified in the above embodiments. For example, in the first and second embodiments, one or two of the soft-breaking switching element 42, the off-state holding switching element 60 and the series regulator 22 may be used for the forced turn-off operation. In this case, the bypass switching element 82 of the fourth embodiment may further be used.

In the case where the operation signal g*# commands an on-state, the charging switching element 24 may be switched off and the discharging switching element 30 may be switched on. In this case, one or two of the soft-breaking switching element 42, the off-state holding switching element 60 and the series regulator 22 may further be used for the forced turn-off operation. Further, in this case, the bypass switching element 82 of the fourth embodiment may be used.

When a plurality of means are used for the forced turn-off operation, these plurality of means may not necessarily be simultaneously operated. For example, in the case where the soft-breaking switching element 42 and the off-state holding switching means 60 are used, the soft-breaking switching element 42 may be switched on first and then the off-state holding switching element 60 may be switched on. In this way, a path having large impedance may be used first to suppress the surge that accompanies the forced turn-off operation.

The normal discharge path is not limited to the one that connects between the gate and the emitter of the switching element S*#. For example, the path may connect a terminal having a potential lower than that of the emitter of the switching element S*# to the gate.

The driven switching elements are not limited to IGBTs (insulated gate bipolar transistors). For example, MOSFETs (metal-oxide semiconductor field-effect transistors) may be used as driven switching elements. In this case, each MOSFET may not only be an N-channel MOSFET but also a P-channel MOSFET. In this case, the discharge path for discharging electrical charges for the purpose of turning on the driven switching element may be a path, for example, which connects the conduction control terminal and the input terminal of the driven switching element.

The driven switching elements are not limited to configure an inverter IV and a step-up/down chopper circuit (converter CV). For example, the driven switching elements may configure a step-down converter for stepping down the voltage of the high-voltage battery 12 for application to the low-voltage battery 16.

What is claimed is:

1. An apparatus for driving a voltage controlled switching element having a conduction control terminal, comprising:
   voltage determining means for determining whether or not voltage at the conduction control terminal is at a first voltage which is lower than a second voltage and which is equal to or more than a threshold voltage, the second voltage being a voltage provided when the switching element is in a normal on-state thereof, the threshold voltage being voltage at which the switching element is switched on;
   forcible switching-off means that forcibly switches off the switching element when it is determined by the voltage determining means that the voltage at the conduction control terminal is at the first voltage; and
   a power supply that generates the second voltage;
   a charging path electrically connecting the conduction control terminal of the switching element and the power supply;
   a charging switching element that selectively opens and closes the charging path;
   a normal discharge path that discharges, from the conduction control terminal, electric charge which allow the switching element to be turn on; and
   a discharging switching element that selectively opens and closes the normal discharge path.

2. The apparatus of claim 1, wherein the forcible switching-off means is configured to forcibly switch off the switching element during a period of time other than a transition period during which the switching element is switched to provide the second voltage in response to a switching-on command and a transition period during which the switching element is switched to provide a third voltage provided when the switching element is in a normal off-state thereof in response to a switching-off command, when it is determined by the voltage determining means that the voltage at the conduction control terminal is at the first voltage.

3. The apparatus of claim 1, wherein the forcible switching-off means is configured to forcibly switch off the switching element during a period of time during which the switching-off command is given to the switching element but which is outside a transition period during which the switching element is switched to provide a third voltage provided when the switching element is in a normal off-state thereof in response to a switching-off command, when it is determined by the voltage determining means that the voltage at the conduction control terminal is at the first voltage.

4. The apparatus of claim 1, wherein the forcible switching-off is configured to forcibly switch off the switching element during a period of time during which the switching-on command is given to the switching element but which is outside a transition period during which the switching element is switched to provide the second, when it is determined by the voltage determining means that the voltage at the conduction control terminal is at the first voltage.

5. The apparatus of claim 1, further comprising:
a soft-breaking discharge path which is higher in impedance than the normal discharge path, and
a soft-breaking switching element that selectively opens and closes the soft-breaking discharge path,
wherein the forcible switching-off means is configured to drive the soft-breaking switching element for the forcible switching-off operation.

6. The apparatus of claim 1, further comprising:
an off-state holding switching element that holds an off state of the switching element by short-circuiting an electrical connection between the conduction control terminal of the switching element and either an input terminal of an output terminal of the switching element,
wherein the forcible switching-off means is configured to drive the off-state holding switching element for the forcible switching-off operation.

7. The apparatus of claim 1, wherein the forcible switching-off means is configured to turn off the power supply for the forcible switching-off operation.

8. The apparatus of claim 1, wherein the forcible switching-off means is configured to switch off the charging switching element during a period of time during which the switching-on command is given to the switching element but which is outside a transition period during which the switching element is switched to provide the second voltage, when it is determined by the voltage determining means that the voltage at the conduction control terminal is at the first voltage.

9. The apparatus of claim 1, wherein the forcible switching-off means is configured to switch on the discharging switching element during a period of time during which the switching-on command is given to the switching element but which is outside a transition period during which the switching element is switched to provide the second voltage, when it is determined by the voltage determining means that the voltage at the conduction control terminal is at the first voltage.

10. The apparatus of claim 1, further comprising:
a member consisting of a plurality of zener diodes and a clamping switching element which are electrically connected in series with each other between the conduction control terminal of the switching element and either an input or an output terminal of the switching element,
clamping control means for switching on the clamping switching element such that current flowing through the switching element becomes larger than a threshold current, which causes voltage at the conduction control terminal to be set to a specified voltage, and
a bypass switching element electrically serially connected to part of the plurality of zener diodes and electrically parallely connected to a further member consisting of a remainder of the zener diodes and the clamping switching element which are electrically connected in series with each other,
wherein the forcible switching-off means is configured to switch on the bypass switching element for the forcible switching-off operation.

11. The apparatus of claim 10, wherein
the switching element is composed of each of a high-potential-side switching element and a low-potential-side switching element which are provided as a pair of switching elements,
the switching element is composed of each of a high-potential-side switching element and a low-potential-side switching element which are provided as a pair of switching elements,
the pair of switching elements are controlled to repeat first and second switched states at intervals, the first switched state allowing one of the paired switching elements to be switched on and the other switching element to be switched off, the second switched state allowing the one switching element to be switched off and the other switching element to be switched on, and
the second voltage permits the switching element to be driven in a non-saturated region thereof with drive current which is greater than the threshold current.

12. The apparatus of claim 1, further comprising:
a soft-breaking discharge path which is higher in impedance than the normal discharge path,
a soft-breaking switching element that selectively opens and closes the soft-breaking discharge path, and
an off-state holding switching element that holds an off state of the switching element by short-circuiting an electrical connection between the conduction control terminal of the switching element and either an input terminal of an output terminal of the switching element,
wherein the forcible switching-off means is configured to perform at least two of five operations for the forcible switching-off operation, the five operations including a switchover operation of the charging switching element from an on-state thereof to an off-state thereof, a switchover operation of the discharging switching element from an off-state thereof to an on-state thereof, a switching-on operation of the soft-breaking switching element, a switching-on operation of the off-state holding switching element, and a turn-off operation of the power supply.

13. The apparatus of claim 1, wherein
the switching element is composed of each of a high-potential-side switching element and a low-potential-side switching element which are provided as a pair of switching elements,
the pair of switching elements are controlled to repeat first and second switched states at intervals, the first switched state allowing one of the paired switching elements to be switched on and the other switching element to be switched off, the second switched state allowing the one switching element to be switched off and the other switching element to be switched on,
the apparatus includes fail safe performing means that forcibly switches off both the switching elements of the pair of switching elements when current flowing through at least one of the paired switching elements becomes equal to or greater than a threshold, and
the forcible switching-off means is configured to make the fail safe performing means operative for the forcible switching-off operation, by changing an output voltage of the power supply so that a value of the first voltage is shifted to a value of the second voltage.

14. The apparatus of claim 1, further comprising notification means that issues a notice showing that the forcible switching-off operation is performed.

* * * * *